(12) United States Patent
Suzuki

(10) Patent No.: US 9,214,886 B2
(45) Date of Patent: Dec. 15, 2015

(54) CONTROL APPARATUS FOR THREE-PHASE ROTARY MACHINE

(71) Applicant: DENSO CORPORATION, Kariya, Aichi-pref. (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 259 days.

(21) Appl. No.: 13/945,311

(22) Filed: Jul. 18, 2013

(65) Prior Publication Data

US 2014/0062375 A1 Mar. 6, 2014

(30) Foreign Application Priority Data

Aug. 29, 2012 (JP) ................................ 2012-189014

(51) Int. Cl.
| | |
|---|---|
| *H02P 9/10* | (2006.01) |
| *H02P 25/02* | (2006.01) |
| *H02P 21/00* | (2006.01) |
| *H02P 21/12* | (2006.01) |
| *H02P 21/04* | (2006.01) |

(52) U.S. Cl.
CPC ............ *H02P 25/02* (2013.01); *H02P 21/0035* (2013.01); *H02P 21/0085* (2013.01); *H02P 21/04* (2013.01); *H02P 21/12* (2013.01); *H02P 25/026* (2013.01)

(58) Field of Classification Search
CPC .............................. H02P 27/04; H02M 11/44
USPC .......... 318/727, 700, 400.01, 400.24, 400.25, 318/400.27, 400.14, 400.38, 496, 629, 318/400.02, 807, 723; 363/13, 1, 17, 21.01
See application file for complete search history.

(56) References Cited

U.S. PATENT DOCUMENTS

| | | | | | |
|---|---|---|---|---|---|
| 3,781,616 | A | * | 12/1973 | Mokrytzki et al. | ........... 318/801 |
| 6,630,804 | B2 | * | 10/2003 | Moriya et al. | ................... 318/85 |
| 7,034,493 | B2 | * | 4/2006 | Yoshimoto et al. | ........... 318/629 |
| 7,084,603 | B2 | * | 8/2006 | Taguchi | ................ H02P 25/023 318/139 |
| 7,161,323 | B2 | * | 1/2007 | Ajima | .................... B62D 5/046 318/560 |
| 7,170,247 | B2 | * | 1/2007 | Yoshinaga | .............. H02P 21/05 318/448 |
| 7,176,652 | B2 | * | 2/2007 | Wakabayashi et al. | .. 318/400.02 |
| 7,701,989 | B2 | * | 4/2010 | Kitamura | .................. H01S 5/40 372/38.02 |

(Continued)

FOREIGN PATENT DOCUMENTS

JP 3804686 5/2006

OTHER PUBLICATIONS

Office Action (2 pages) dated Aug. 1, 2014, issued in corresponding Japanese Application No. 2012-189014 and English translation (2 pages).

*Primary Examiner* — Rita Leykin
(74) *Attorney, Agent, or Firm* — Nixon & Vanderhye P.C.

(57) ABSTRACT

An ECU having two inverters outputs AC currents, which have the same amplitude and a phase difference of 30°. When motor magnetic fluxes include distortion component of fifth harmonic, a torque ripple of sixth harmonic is generated in a torque of each drive system. The torque ripples of sixth harmonic are cancelled out in a sum of torques of the two drive systems. A fifth harmonic current having a frequency of five-fold are superimposed on base components of currents so that peak values of the base wave currents are reduced. As a result, heat generation arising from current peak values can be reduced.

6 Claims, 13 Drawing Sheets

(56) References Cited

U.S. PATENT DOCUMENTS

| | | | |
|---|---|---|---|
| 7,768,220 B2 * | 8/2010 | Schulz | H02P 29/0038 318/400.02 |
| 8,497,698 B2 * | 7/2013 | Yeh | 324/765.01 |
| 8,659,260 B2 * | 2/2014 | Mukai et al. | 318/801 |
| 2009/0237014 A1 * | 9/2009 | Yamada | H02P 21/145 311/400.02 |
| 2010/0019708 A1 | 1/2010 | Okubo | |
| 2011/0163708 A1 * | 7/2011 | Mukai et al. | 318/722 |
| 2012/0049782 A1 | 3/2012 | Suzuki | |
| 2014/0145547 A1 * | 5/2014 | Nakano et al. | 310/216.069 |

\* cited by examiner

CONTROL APPARATUS FOR THREE-PHASE ROTARY MACHINE

CROSS REFERENCE TO RELATED APPLICATION

This application is based on and incorporates herein by reference Japanese patent application No. 2012-189014 filed on Aug. 29, 2012.

FIELD

The present disclosure relates to a control apparatus for a three-phase rotary machine.

BACKGROUND

It is conventionally known in a drive control apparatus for a three-phase rotary machine, which has a three-phase coil set, to reduce torque ripple by superimposing n-th harmonic on a main component of an AC current (for example, JP 3804686 corresponding to JP-A-2006-158198). The n-th harmonic (harmonic of n-th degree) in this case is typically the fifth harmonic.

Torque of a rotary machine is determined by a product of a current and a magnetic flux, and hence no torque ripple arises if the product of the current and the magnetic flux does not change with phases. In a case that magnetic flux contains distortion component, however, torque ripple is likely to arise because of influence of torque corresponding to the distortion component.

In the drive control apparatus disclosed in the above-described patent document, a motor is driven by one drive system of a power converter. For example, when a fifth harmonic current having a certain amplitude is superimposed on a main component of an AC current based on the above-described patent document in a case that the magnetic flux contains the fifth harmonic distortion component, the torque corresponding to the distortion component of the magnetic flux and the torque corresponding to the fifth harmonic current act to cancel out each other.

However, depending on a relation between the amplitude (magnitude) of the distortion component of the magnetic flux and the amplitude of the superimposed harmonic current, the torque is not always cancelled out and torque ripple remains in some cases. If a peak value of a phase current is high, the power converter and the coil set tend to generate large heat.

SUMMARY

It is therefore an object to provide a control apparatus for a three-phase rotary machine, which reduces heat generation without increasing torque ripple.

According to one aspect, a control apparatus is provided for controlling driving of a three-phase rotary machine having two three-phase winding sets. The control apparatus includes two drive systems of power converters and a controller unit. The two drive systems are provided in correspondence to the two three-phase winding sets to output AC currents to the two three-phase winding sets. The AC currents have same amplitude each other and a phase difference of $(30\pm 60\times n)°$ therebetween, with "n" being an integer. The controller unit controls output of the three-phase rotary machine. The controller unit superimposes on a base wave current, which is an AC current and main component of an output of the three-phase rotary machine, a fifth harmonic current of a frequency of as high as fivefold of the base wave current, thereby reducing a peak value of the base wave current.

EMBODIMENT

Figure 1:
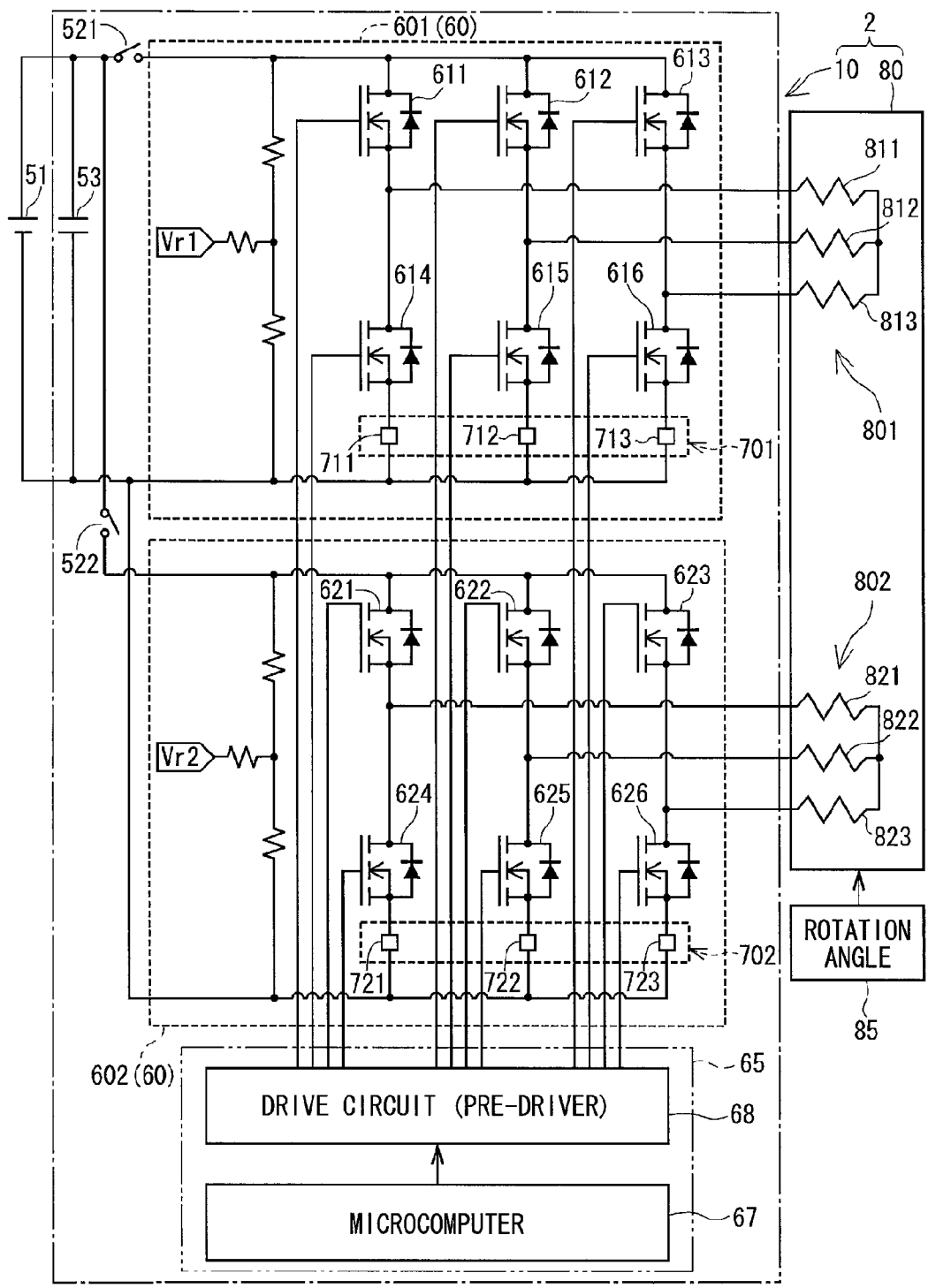
FIG. 1 is a circuit diagram of a two drive systems inverter for a three-phase rotary machine, which is controlled by a control apparatus according to a first embodiment.

A control apparatus for a three-phase rotary machine will be described with reference to plural embodiments shown in the drawings. The control apparatus for a three-phase rotary machine is used for an electric power steering system of a vehicle.

First Embodiment

A basic configuration of a control apparatus for a three-phase rotary machine, which is common among the plural embodiments, will be described first with reference to FIG. 1 to FIG. 4.

Figure 2:
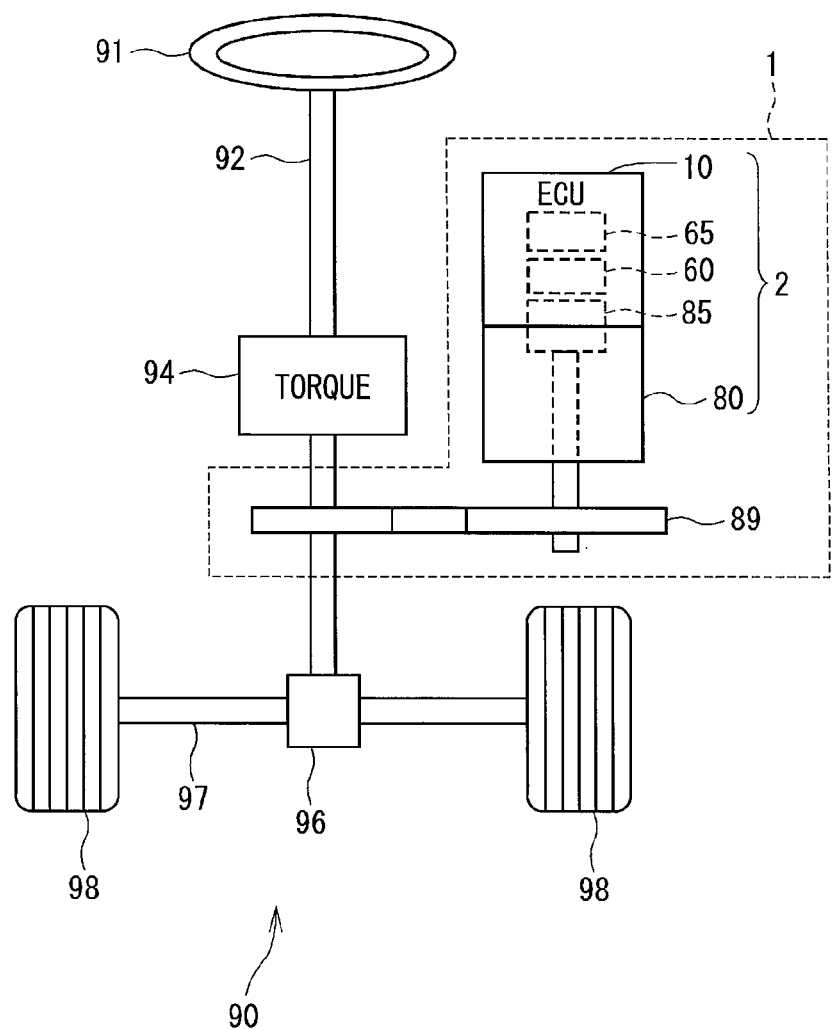
FIG. 2 is a schematic view of an electric power steering system, for which the control apparatus for a three-phase rotary machine according to the first embodiment is used.

Referring to FIG. 2, an electric power steering system 1 is provided for a steering system 90 of a vehicle. A steering wheel 91 is fixed to the top of a steering shaft 92, which is provided with a torque sensor 94 for sensing the steering torque. The bottom of the steering shaft 92 has a pinion gear 96, which is in mesh with a rack shaft 97. A pair of tire wheels 98 is connected rotatably to both longitudinal ends of the rack shaft 97 by tie rods, etc. The pinion gear 96 converts rotational motion of the steering shaft 92 into linear motion of the rack shaft 97. The pair of wheels 98 is steered by an angle corresponding to linear displacement of the rack shaft 97.

The electric power steering system 1 includes an electric actuator 2 and speed reduction gears 89. The actuator 2 rotates its rotating shaft. The gears 89 reduce the rotation of the rotating shaft and transmit the reduced rotation to the steering shaft 92. The actuator 2 includes an electric motor 80 as a three-phase rotary machine, which generates a steering assist torque, and an electronic control unit (ECU) 10 as a control apparatus, which drives the motor 80. The motor 80 is a three-phase brushless motor and rotates the speed reduction gears 89 in both normal and reverse directions.

The ECU 10 includes a controller unit 65 and an inverter unit 60 as a power converter, which controls the power supply to the motor 80 in accordance with commands from the controller unit 65. A rotation angle sensor 85 is provided to sense the rotation angle of the motor 80. The sensor 85 includes a magnet as a magnetism generating member disposed in the motor 80 and a magnetism sensing element disposed in the ECU 10.

The controller unit 65 controls the output to the inverter unit 60 based on a steering torque signal from the torque sensor 94, a rotation angle signal from the rotation angle sensor 85, and the like. With this control, the actuator 2 of the electric power steering system 1 generates steering assist torque for assisting the steering wheel 91 to be turned. Also, the actuator 2 transmits the generated torque to the steering shaft 92.

In more detail, as shown in FIG. 1, the motor 80 includes two three-phase winding sets 801 and 802. The first three-phase winding set 801 includes a U-phase winding (U1 coil) 811, a V-phase winding (V1 coil) 812 and a W-phase winding (W1 coil) 813. The second three-phase winding set 802 also includes a U-phase winding (U2 coil) 821, a V-phase winding (V2 coil) 822, and a W-phase winding (W2 coil) 823.

The inverter unit 60 includes a first inverter 601 and a second inverter 602, which are associated with the first winding set 801 and the second winding set 802, respectively. Hereinafter, a unit of combination of one inverter and one associated three-phase winding set form one drive system.

The ECU 10 further includes, in addition to the inverter unit 60 and the controller unit 65, power supply relays 521, 522, a capacitor 53, a first drive system current sensor 701, a second drive system current sensor 702, and the like. The current sensors 701, 702 detect phase currents, which are supplied from the inverters 601, 602 to the winding sets 801, 802, respectively. A battery 51 may be a DC power supply of 12 volts, for example. The power supply relays 521, 522 are capable of cutting off the power supply from the battery 51 to the inverters 601, 602. The capacitor 53 is connected in parallel with the battery 51 to accumulate electric charge, supplement the power supply to the inverters 601, 602, and suppress noise components such as surge currents.

The first inverter 601 includes six switching elements 611 to 616 connected in a bridge circuit form to switch the power supply to the windings 811, 812, 813 of the first winding set 801. The switching elements 611 to 616 are MOSFETs (metal oxide semiconductor field-effect transistors). The switching elements 611 to 616 are referred to as FETs 611 to 616.

Drains of the FETs 611, 612, 613 of the high-potential side are connected to the positive electrode of the battery 51. Sources of the FETs 611, 612, 613 are connected to drains of the FETs 614, 615, 616 of the low-potential side, respectively. The sources of the FETs 614, 615, 616 are connected to the negative electrode of the battery 51 via current sensing elements 711, 712, 713, which form a current sensor 701, respectively. Junctions between the FETs 611, 612, 613 of the high-potential side and the FETs 614, 615, 616 of the low-potential side are connected to one ends of the windings 811, 812, 813, respectively. The current sensing elements 711, 712, 713 detect phase currents supplied to the windings 811, 812, 813 of U-phase, V-phase, W-phase of the first drive system, respectively.

In the second inverter 602, the switching elements (FETs) 621 to 626 and the current sensing elements 721, 722, 723 forming a current sensor 702 are configured similarly as in the first inverter 601. The controller unit 65 includes a microcomputer 67 and a drive circuit (pre-driver) 68 and the like. The microcomputer 67 calculates various control values based on input signals such as the steering torque signal and the rotation angle signal. The drive circuit 68 is connected to gates of the FETs 611 to 616 and 621 to 626, and switches on and off the FETs under control by the microcomputer 67.

Figure 3A:
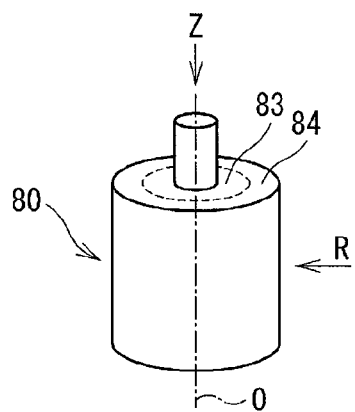
FIGS. 3A, 3B and 3C are schematic diagrams of a three-phase motor, for which the control apparatus according to the first embodiment is used.
Figure 3B:
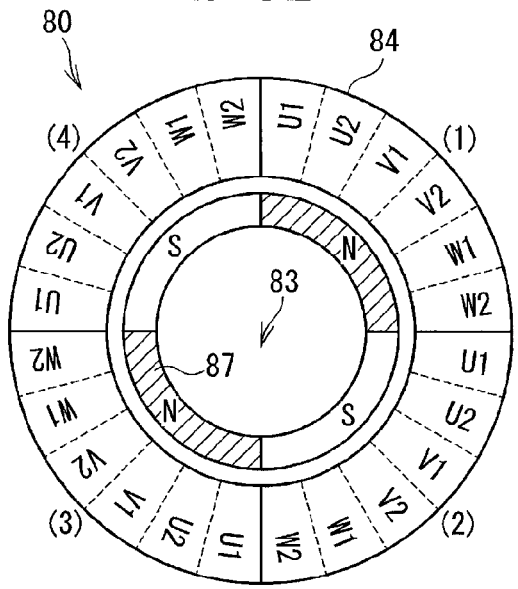
Figure 3C:
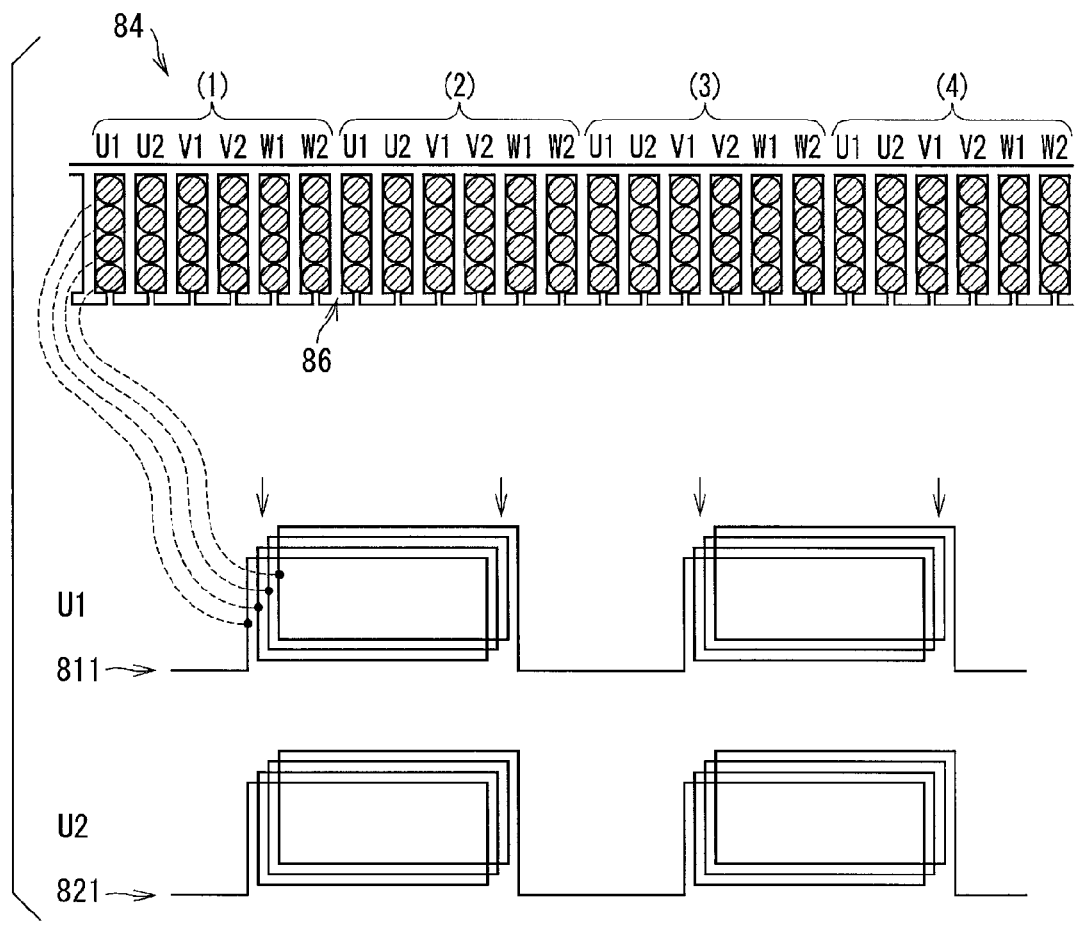

The motor 80 is configured as shown in FIG. 3. As shown in FIG. 3A, the motor 80 is configured so that a rotor 83 rotates relative to a stator 84 about a rotation axis O. The three-phase brushless motor 80 is characterized in that the number of coils of the stator 84 is 12×m and the number of poles of permanent magnets 87 of the rotor 83 is 2×m. Here, "m" is a natural number. FIGS. 3A to 3C shows an example, in which the number "m" is 2. The number "m" may be another natural number other than 2.

FIG. 3B shows schematically the permanent magnets 87 and the stator 84 of the rotor 83 as viewed in a thrust direction Z (FIG. 3A). The permanent magnets 87 have a total of four (=2×2) poles in such a manner that the N-pole and the S-pole are alternated twice. The stator coils include twenty-four (12×2) coils. The twenty-four coils are grouped into four coil groups, each coil group including six coils. In each coil group, a U1 coil, a U2 coil, a V1 coil, a V2 coil, a W1 coil, and a W2 coil are arranged in that order clockwise at every interval of electrical angle of 30°. Two coil groups form one winding set. FIG. 3C show a view of development of the stator 84 as viewed in the thrust direction Z and a view of development of the windings as viewed in a radial direction R (FIG. 3A). For example, the winding forming the U1 coil is formed by sequentially winding a coil wire about a protrusion 86, which is arranged at every sixth protrusions.

Consequently, in the U-phase, the electrical angle of the U1 coil 811 is 0°, the electrical angle of the U2 coil 821 is +30°. That is, the U2 coil 821 is in a positional relation of +30° relative to the U1 coil 811. Similarly in the W-phase, the W2 coil 823 of the electrical angle +150° is in a positional relation of +30° relative to the W1 coil 813. In the V-phase, the current is supplied in reverse. For this reason, the electrical angle of the V1 coil 812 is −120° (=60°-180° and the electrical angle of the V2 coil 822 is)-90° (=90°-180°. Thus, the V2 coil 822 is in a positional relation of +30° relative to the V1 coil 812. As a result, the phase of the three-phase AC current supplied to the second winding set 802 is delayed 30° relative to the phase of the three-phase AC supplied to the first winding set 801. Amplitudes of the three-phase AC currents supplied to the two winding sets 801 and 802 are set to be equal to each other.

Figure 4:
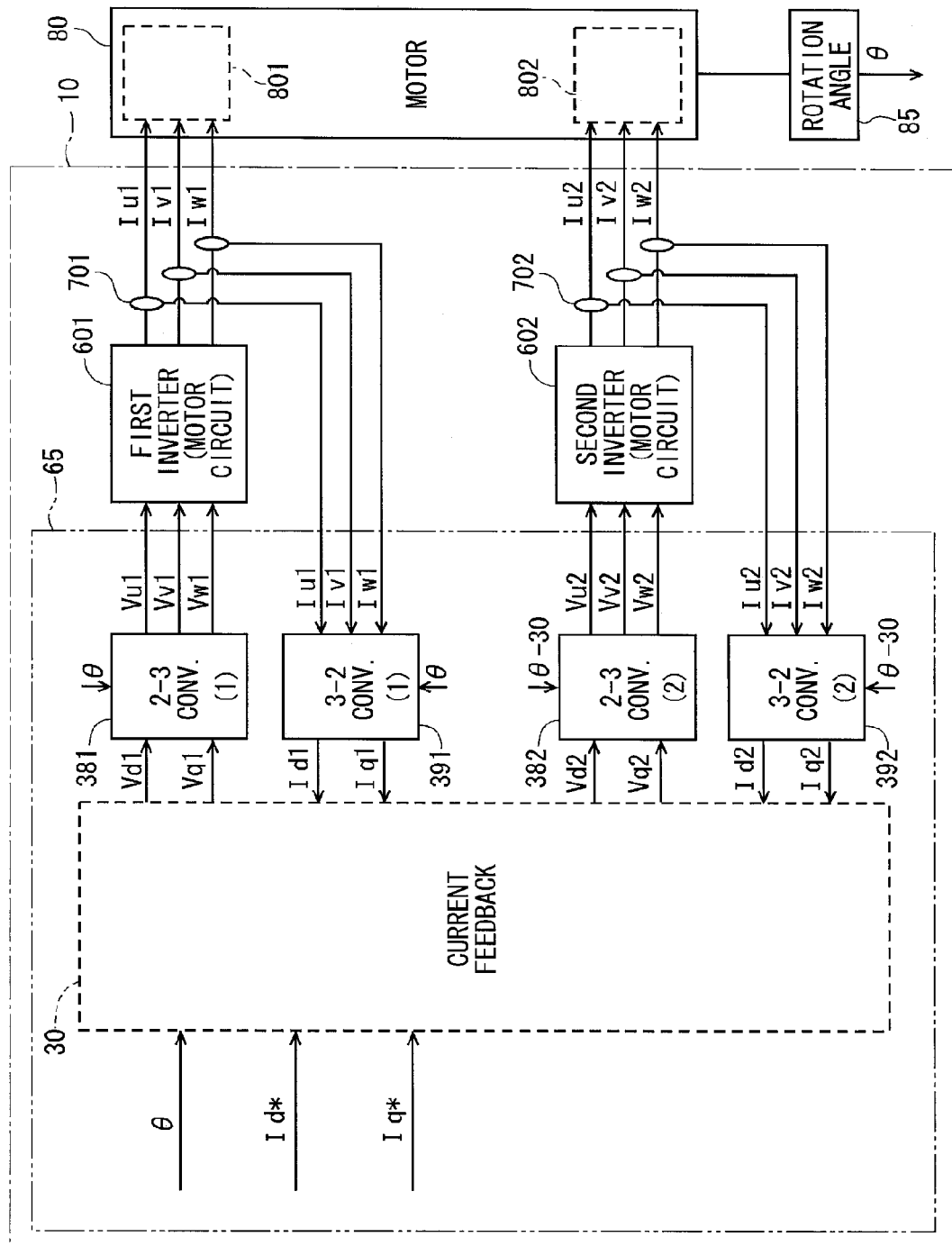
FIG. 4 is a block diagram of the control apparatus for a three-phase motor according to the first embodiment.

A block diagram of the entirety of ECU 10 is shown in FIG. 4. As described with reference to FIG. 2, the ECU 10 controls driving of the motor 80 by the controller unit 65, which controls the currents supplied from the first inverter 601 and the second inverter 602 to the first winding set 801 and the second winding set 802, respectively. Here, the AC current, which is a main component of the output to the motor 80 is referred to as a base wave current. The base wave current corresponds to a current of a base component (component of first degree) of a sine wave. The current sensors 701, 702 sense the phase currents, which are supplied from the inverters 601, 602 to the winding sets 801, 802 phase by phase, respectively, and feed back the sensed currents to the controller unit 65.

As indicated by a two-dot chain line in FIG. 4, the controller unit 65 includes a current feedback calculation section 30, three-phase to two-phase conversion sections (3-2 conversion sections) 381, 382, two-phase to three-phase conversion sections (2-3 conversion sections) 391, 392, and the like. In FIG. 4 and subsequent figures, numbers 1 and 2 are attached at the ends of reference symbols, which indicate currents and voltages, thereby to distinguish the first drive system and the second drive system, respectively.

The current feedback calculation section 30 will be described here only with respect to outline of its input and output, which are common among the plural embodiments. Its details will be described later with reference to each embodiment. In this section 30, the rotation angle 8, a d-axis current command value Id* and a q-axis current command value Iq* are inputted. Here, the d-axis and the q-axis are two axes of the d-q coordinate.

The d-axis current command value Id* is a current command value of a d-axis current, which is in parallel with the direction of magnetic flux. The q-axis current command value Iq* is a current command value of a q-axis current, which is orthogonal to the d-axis. The d-axis current value Id* and the q-axis current value Iq* are used as common values between the two drive systems for control operations in some embodiments or used as a sum or difference of such current command values for control operations in the other embodiments.

In the current feedback calculation section 20, current detection values Id1, Iq1, Id2, Iq2, which are produced by conversion of 3-2 conversion sections 391, 392 of each system, are inputted. The current feedback calculation section 30 performs control calculations based on the current command values and the current detection values and outputs voltage command values Vd1, Vq1, Vd2, Vq2 to 2-3 conversion sections 381, 382 of each system. The current feedback calculation section 30 further superimposes a sixth harmonic component of a d-axis current and a sixth harmonic component of a q-axis current, which are calculated based on the rotation angle θ, the d-axis current command value Id*, the q-axis current command value Iq* and a current phase θi, on the current command values, that is, the d-axis current command value Id* and the q-axis current command value Iq*.

The 2-3 conversion section 381 converts the two-phase voltage command values Vd1, Vq1 to three-phase voltage command values Vu1, Vv1, Vw1 of U-phase, V-phase, W-phase based on the rotation angle 8, which is fed back from the rotation angle sensor 85, and outputs them to the first inverter 601. The 2-3 conversion section 382 converts the two-phase voltage command values Vd2, Vq2 to three-phase voltage command values Vu2, Vv2, Vw2 of U-phase, V-phase, W-phase based on the rotation angle (θ-30)°, respectively, and outputs them to the second inverter 602.

The 3-2 conversion section 391 converts three-phase current detection values Iu1, Iv1, Iw1, which are detected by the current sensor 701, to the d-axis current detection value Id1 and the q-axis current detection value Iq1 based on the rotation angle θ.

The 3-2 conversion section 392 converts three-phase current detection values Iu2, Iv2, Iw2, which are detected by the current sensor 702, to the d-axis current detection value Id2 and the q-axis current detection value Iq2 based on the rotation angle (θ-30)°.

Figure 5:
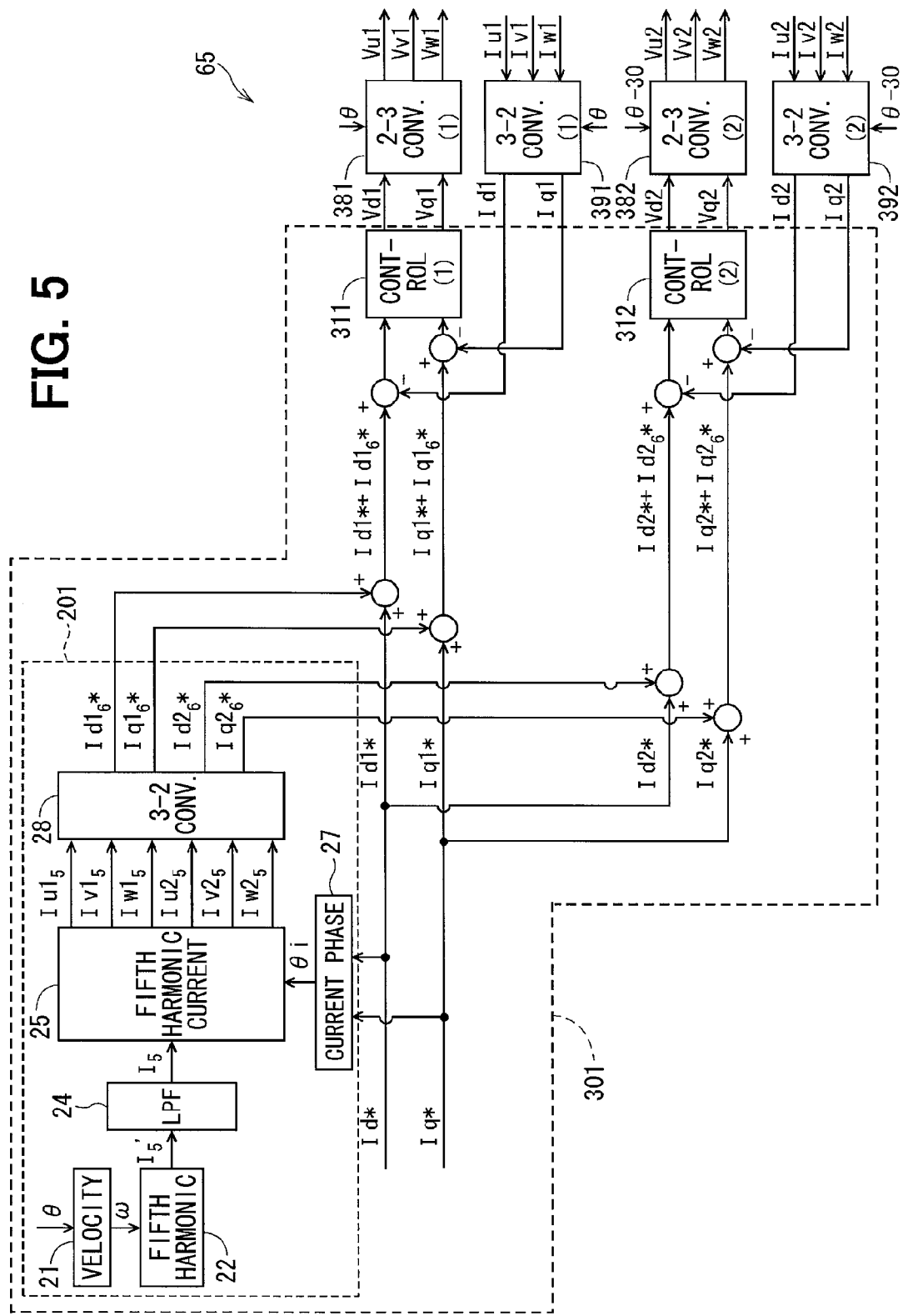
FIG. 5 is a block diagram of a control part of the control apparatus for a three-phase motor according to the first embodiment.

More specifically, according to the first embodiment, the current feedback calculation section 30 is configured as shown in FIG. 5, in which the current feedback calculation section 30 is indicated by a reference numeral 301.

The current feedback calculation section 301 includes, as a main part of feedback, plural adders and subtractors, which are shown at merger points of arrow marks, and controllers 311, 312 of each drive system. A superimposition current calculation section 201, which is a secondary part of feedback, a velocity calculation section 21, a fifth harmonic amplitude calculation section 22, a low-pass filter 24, a fifth harmonic current calculation section 25, a current phase calculation section 27 and a three-phase to two-phase conversion section (3-2 conversion section) 28. In the main part, the current command value Id*, Iq* are divided into current command values Id1*, Iq1* of the first drive system and Id2*, Iq2* of the second drive system. Since the electric characteristics of the first inverter 601 and the second inverter 602 are the same, basically one-half of the current command value is commanded to each drive system.

Figure 6A:
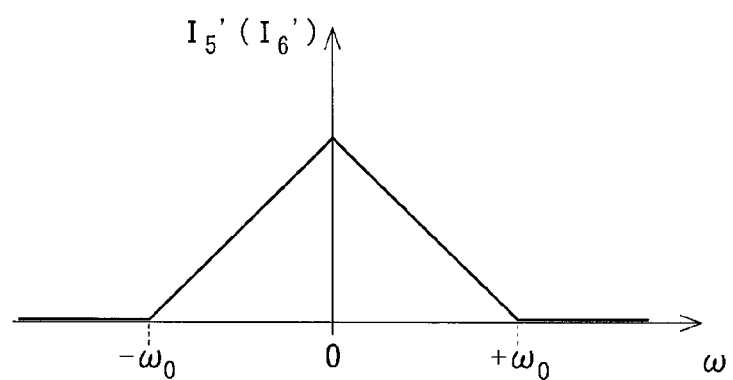
FIGS. 6A, 6B and 6C are characteristic charts, each showing a relation between a rotation angular velocity and an amplitude of a superimposed current of a three-phase rotary machine.

In the superimposition current calculation section 201, the velocity calculation section 21 calculates an angular velocity ω of rotation. The amplitude calculation section 22 calculates a fifth harmonic current amplitude $I_5'$ of the AC current in accordance with the angular velocity ω. The fifth harmonic current the AC current corresponds to the fifth harmonic wave component of current, which has a frequency of as high as fivefold of the base wave current, that is, the base component. The harmonic wave means a wave, which is used positively, and does not mean negative components such as noise. Calculation means not only arithmetic operation but also retrieval of mapped data. For example, as shown in FIG. 6A, the relation between the angular velocity ω and the fifth harmonic current amplitude $I_5'$ of the AC current is so set that the fifth harmonic current amplitude $I_5'$ increases as the angular velocity ω approaches zero. The positive or negative polarity of the angular velocity ω indicates a direction of rotation of the motor 80. When the angular velocity ω is less than a threshold value $-\omega_0$ or greater than a threshold value $+\omega_0$, the fifth harmonic current amplitude $I_5'$ is set to 0 so that the fifth harmonic current will not be superimposed.

Figure 6B:
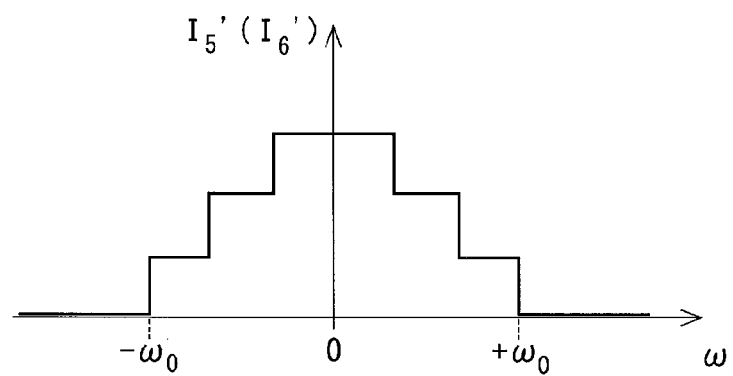
Figure 6C:
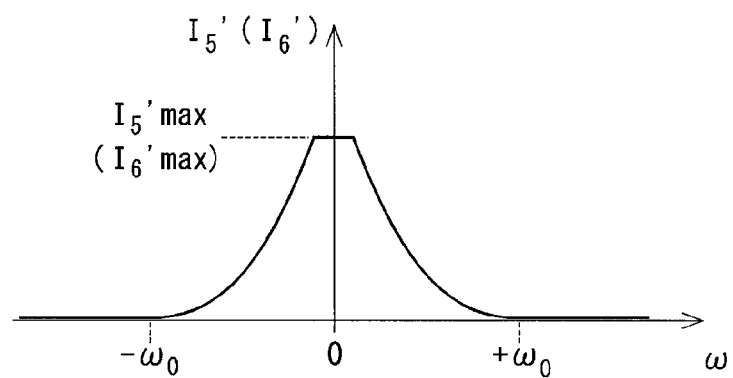

In the example shown in FIG. 6A, the fifth harmonic current amplitude $I_5'$ is changed linearly in a range, in which the angular velocity ω is between zero and $\pm\omega_0$. As a modified example, as shown in FIG. 6B, the fifth harmonic current amplitude $I_5'$ may be changed in steps in the range, in which the angular velocity ω is between zero and $\pm\omega_0$. Alternatively, as shown in FIG. 6C, the fifth harmonic current amplitude $I_5'$ may be changed in generally inverse-proportion to the angular velocity ω in a range, which is equal to or less than a predetermined maximum value $I_5'$ max of the fifth harmonic current amplitude $I_5'$.

Figure 7:
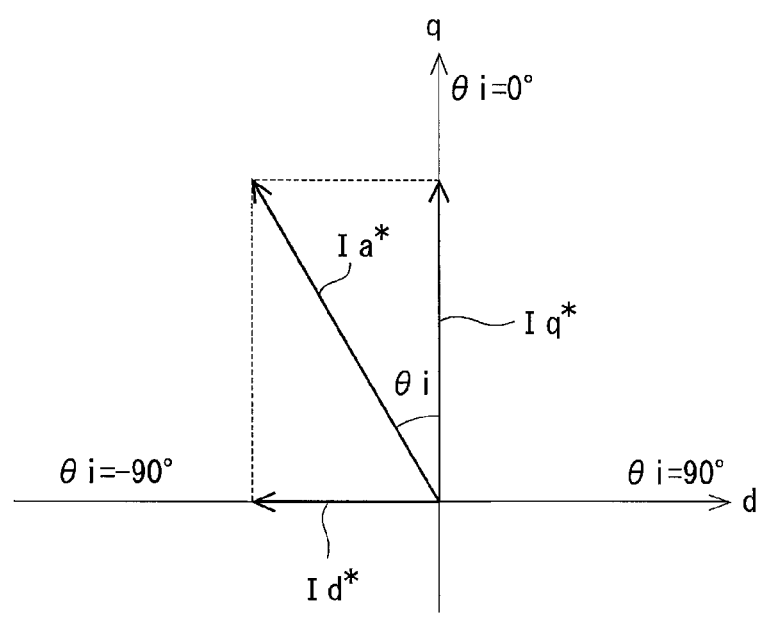
FIG. 7 is an explanatory chart showing a current phase on a d-q axis coordinate.

The low-pass filter 24 processes the fifth harmonic current amplitude $I_5'$, which is calculated in accordance with the angular velocity ω as described above, and inputs it to the fifth harmonic current calculation section 25 as a filtered current amplitude $I_5$. The fifth harmonic current calculation section 25 calculates the current phase θi based on the current command values Id*, Iq*. It is noted that, as shown in FIG. 7, the current phase θi corresponds to an angle of a current vector Ia* relative to the q-axis as a reference. The current vector Ia* has a d-axis component Id* and a q-axis component Iq* in the d-q axis coordinate. The current phase θi is defined to be positive and negative in the clockwise direction and the counter-clockwise direction from the q-axis, respectively.

The fifth harmonic current calculation section 25 calculates the fifth harmonic phase currents by using the current amplitude $I_5$ and the current phase $\theta i$ by the following equations (1.1) to (1.6). Here, $\theta$ is a phase of an electrical angle relative to the U-phase axis of the first drive system as a reference. In the following equations, unit of angle (°) is abbreviated for simplicity.

$$Iu1_5 = I_5 \sin(5\theta - \theta i) \quad (1.1)$$

$$Iv1_5 = I_5 \sin(5(\theta - 120) - \theta i) \quad (1.2)$$

$$Iw1_5 = I_5 \sin(5(\theta + 120) - \theta i) \quad (1.3)$$

$$Iu2_5 = I_5 \sin(5(\theta - 30) - \theta i) \quad (1.4)$$

$$Iv2_5 = I_5 \sin(5(\theta - 150) - \theta i) \quad (1.5)$$

$$Iw2_5 = I_5 \sin(5(\theta + 90) - \theta i) \quad (1.6)$$

The 3-2 conversion section 28 d-q converts the phase currents $Iu1_5$, $Iv1_5$, $Iw1_5$, $Iu2_5$, $Iv2_5$, $Iw2_5$ of each drive system calculated by the fifth harmonic current calculation section 25 to the superimposition current command values $Id1_6^*$, $Iq1_6^*$, $Id2_6^*$, $Iq2_6^*$ of sixth harmonic components of each drive system. These superimposition current command values $Id1_6^*$, $Iq1_6^*$, $Id2_6^*$, $Iq2_6^*$ are added to the current command values $Id1^*$, $Iq1^*$, $Id2^*$, $Iq2^*$, respectively, in the main part.

Thus the controller 311 of the first drive system is inputted with a d-axis current command value ($Id1^*+Id1_6^*$) and a q-axis current command value, ($Iq1^*+Iq1_6^*$), which include the added superimposition current command values, and a deviation from the current detection values which are fed back from the 3-2 conversion section 391. The controller 311 calculates the voltage command values Vd1, Vq1 of the first drive system by proportional and integral control calculation to reduce the deviations to 0. Similarly, the controller 312 of the second drive system is inputted with deviations between ($Id2^*+Id2_6^*$), ($Iq2^*+Iq2_6^*$) and Id2, Iq2. The controller 312 calculates the voltage command values Vd2, Vq2 of the second drive system by proportional and integral control calculation to reduce the deviations to 0 by feedback control.

The operation and advantage provided by the controller unit 65 including the current feedback calculation section 301 configured as described above will be described next with reference to FIGS. 8A, 8b, 8C, 9A, 9B, 9C, 10. Here, a relation among current, magnetic flux and torque in a general motor of one drive system control will be explained first. Then, current and torque characteristics will be explained with respect to cases, in which the harmonic wave current of the fifth harmonic component is superimposed on the base wave current of the base component (FIGS. 8A, 8B, 8C) and not superimposed (FIGS. 9A, 9B, 9C, 10) in the ECU 10 for the motor of two drive systems, which outputs the AC currents having a phase difference of 30°. In FIGS. 8A, 8B, 8C to FIG. 10, waveforms of the current and the magnetic flux of only the U-phase are shown representatively. Symbols used in the following explanation are defined as follows.

$I^{++}_1$: current amplitude of the base component of the motor of one drive system $I^{++}_5$: current amplitude of the fifth harmonic component of the motor of one drive system $I_1$: current amplitude ($=(\frac{1}{2}) \times I^{++}_1$) of the base component of the motor of two drive systems $I_5$: current amplitude ($=(\frac{1}{2}) \times I^{++}_5$) of the fifth harmonic component of the motor of two drive systems $\psi_1$: magnetic flux amplitude of the base component of the motor common between one drive system and two drive systems $\psi_5$: magnetic flux amplitude ($\geq 0$) of the fifth harmonic component of the motor common between one drive system and two drive systems $\theta$: phase or electrical angle (°) one cycle period of the base component is) $\theta = 360°$ $T^{++}$: torque of the motor of one drive system T1: torque of the motor of the first drive system of two drive systems in the first embodiment T2: torque of the motor of the second drive system of two drive systems in the first embodiment Tsum: sum of torques (T1+T2) of the motor of two drive systems in the first embodiment Here, to match the output of the motor of one drive system and the output of the motor of two drive systems, the current amplitudes $I_1$, $I_5$ of the motor of two drive systems are set to one-half of the current amplitudes $I^{++}_1$, $I^{++}_5$ of the motor of one drive system, respectively. The dimensions of current, magnetic flux, and torque are [A], [Wb]=[W×s/A]=[Nm/A] and [Nm]. The dimension of a product of current and magnetic flux hence equals that of torque. Specific numerical values of those physical quantities are not considered.

In the motor of one drive system, if the current and the magnetic flux are both only base component, that is, no high harmonics, the torque $T^{++}$ is constant and not variable with phase B as expressed by the following equation (2).

$$\begin{aligned} T^{++} &= Iu \times \phi u + Iv \times \phi v + Iw \times \phi w \quad (2) \\ &= I^{++}_1 \sin(\theta) \times \phi_1 \sin(\theta) + I^{++}_1 \sin(\theta - 120) \times \phi_1 \sin(\theta - 120) + \\ &\quad I^{++}_1 \sin(\theta + 120) \times \phi_1 \sin(\theta + 120) \\ &= I^{++}_1 \phi_1 \times \{\sin^2(\theta) + \sin^2(\theta - 120) + \sin^2(\theta + 120)\} \\ &= I^{++}_1 \phi_1 \times \left[\sin^2(\theta) + \left\{-\frac{1}{2}\sin(\theta) - \frac{\sqrt{3}}{2}\cos(\theta)\right\}^2 + \right. \\ &\quad \left. \left\{-\frac{1}{2}\sin(\theta) + \frac{\sqrt{3}}{2}\cos(\theta)\right\}^2 \right] \\ &= I^{++}_1 \phi_1 \times \left\{\sin^2(\theta) + \frac{1}{2}\sin^2(\theta) + \frac{3}{2}\cos^2(\theta)\right\} \\ &= I^{++}_1 \phi_1 \times \frac{3}{2}\{\sin^2(\theta) + \cos^2(\theta)\} \\ &= 1.5 \times I^{++}_1 \phi_1 \end{aligned}$$

It is assumed next that the magnetic flux includes the fifth harmonic distortion component. In the following explanation, the amplitude $\psi_5$ of the fifth harmonic of the magnetic flux is defined to be basically zero or a positive value. In a case that the base component of the magnetic flux includes the fifth harmonic distortion component, the magnetic flux of the U-phase, for example, is expressed as a subtraction of the fifth harmonic component ($\psi_5 \sin(5\theta)$) of the magnetic flux from the base component ($\psi_1 \sin \theta$) of the magnetic flux. In a case that the amplitude $\psi_5$ of the fifth harmonic component is defined to be zero or a negative value, the magnetic flux may be expressed as an addition of the fifth harmonic component ($\psi_5 \sin(5\theta)$) of the magnetic flux to the base component ($\psi_1 \sin \theta$) of the magnetic flux.

The torque $T^{++}$ is thus expressed by the following equation (3.1).

$$T^{++} = I_1^{++}\sin(\theta) \times \{\phi_1\sin(\theta) - \phi_5\sin(5\theta)\} + \qquad (3.1)$$
$$I_1^{++}\sin(\theta - 120) \times \{\phi_1\sin(\theta - 120) - \phi_5\sin(5(\theta - 120))\} +$$
$$I_1^{++}\sin(\theta + 120) \times \{\phi_1\sin(\theta + 120) - \phi_5\sin(5(\theta + 120))\}$$
$$= I_1^{++}\phi_1 \times \{\sin^2(\theta) + \sin^2(\theta - 120) + \sin^2(\theta + 120)\} -$$
$$I_1^{++}\phi_5 \times \{\sin(\theta) \times \sin(5\theta) + \sin(\theta - 120) \times \sin(5(\theta - 120)) +$$
$$\sin(\theta + 120) \times \sin(5(\theta + 120))\}$$
$$= 1.5 \times I_1^{++}\phi_1 + 1.5 \times I_1^{++}\phi_5\sin(6\theta + 90)$$
$$= 1.5 \times \{I_1^{++}\phi_1 + I_1^{++}\phi_5\sin(6\theta + 90)\}$$

A part, $\{\sin\theta \times \sin(5\theta) + \ldots\}$, of the second term in the equation (3.1) is the sixth harmonic component of the frequency $6\theta$, which is sixfold of that of the phase $\theta$, as calculated by the following equation (3.2).

$$\{\sin(\theta) \times \sin(5\theta)\} + \{\sin(\theta - 120) \times \sin(5(\theta - 120))\} + \qquad (3.2)$$
$$\{\sin(\theta + 120) \times \sin(5(\theta + 120))\} =$$
$$\{\sin(\theta) \times \sin(5\theta)\} + \{\sin(\theta - 120) \times \sin(5\theta - 600)\} +$$
$$\{\sin(\theta + 120) \times \sin(5\theta + 600)\} =$$
$$\{\sin(\theta) \times \sin(5\theta)\} + \{\sin(\theta - 120) \times \sin(5\theta - 240)\} +$$
$$\{\sin(\theta + 120) \times \sin(5\theta + 240)\} = -\frac{1}{2}\{\cos(6\theta) - \cos(4\theta) +$$
$$\cos(6\theta) - \cos(4\theta - 120) + \cos(6\theta) - \cos(4\theta + 120)\} =$$
$$-\frac{1}{2}\{3 \times \cos(6\theta) - \cos(4\theta) - 2\cos(4\theta)\cos(-120)\} =$$
$$-\frac{1}{2}\left\{3 \times \cos(6\theta) - \cos(4\theta) - 2\cos(4\theta) \times \left(-\frac{1}{2}\right)\right\} =$$
$$-\frac{3}{2}\cos(6\theta) = -1.5 \times \sin(6\theta + 90)$$

Figure 8A:
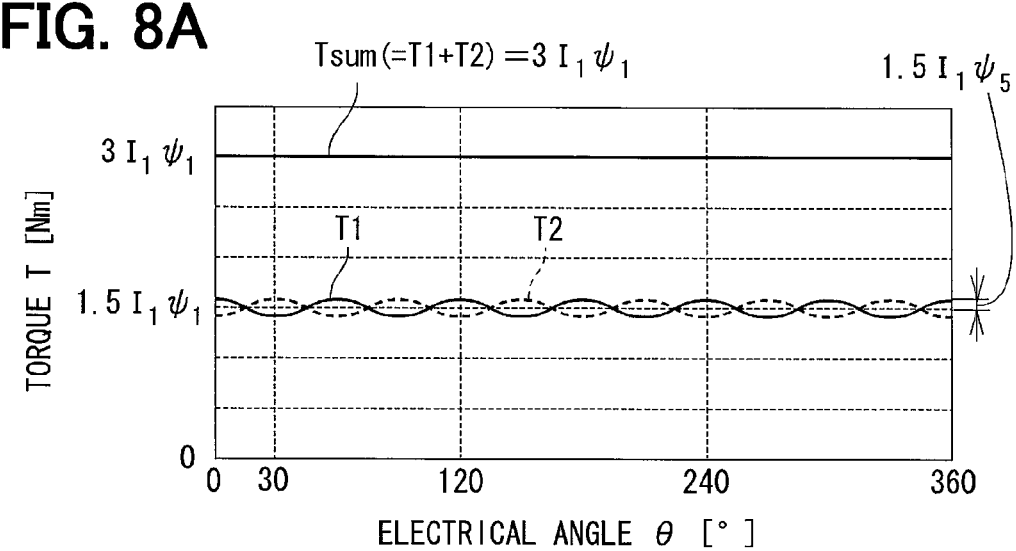
FIGS. 8A, 8B and 8C are waveform charts of torque, current and magnetic flux, respectively, in a case, in which a fifth harmonic current is superimposed in the control apparatus for a three-phase rotary machine according to the first embodiment.

Since the result of calculation of the equation (3.2) is $-1.5 \times \sin(6\theta+90)$, it is to be noted that the sign (polarity) of the second term of the last line in the equation (3.1) is positive. The equation (3.1) indicates that, when the magnetic flux includes the sixth harmonic distortion component, the torque $T^{++}$ is a sum of the term of a constant ($1.5 \times I^{++}_1\psi_1$) and the term of the sixth harmonic. That is, it indicates that torque ripple of sixth harmonic is generated. The waveform of the magnetic flux, which includes the fifth harmonic component in the motor of one drive system, may be referred to by particularly paying attention to only the waveform $\psi u1$ of the first drive system (U-phase) shown in FIG. 8C or FIG. 9C, which is shown in correspondence to the motor of two drive systems. As shown, the waveform of the magnetic flux including the fifth harmonic component has a smoothed peak portion in the base component. FIG. 8C and FIG. 9C show waveforms of the magnetic flux including the fifth harmonic component on an assumption that the amplitude $\psi_5$ of the fifth harmonic component is 5% of the amplitude $\psi_1$ of the base component. Further, as shown as a waveform of torque T1 of the first drive system in FIG. 8A, the sixth harmonic torque ripple is represented as a sine wave of one cycle period of 60°.

It is assumed next that the fifth harmonic component of the current is superimposed on its base component. In a case that the fifth harmonic component is superimposed on the base component, the current is expressed in the similar manner as in the case of magnetic flux. That is, the current is expressed as a subtraction of the fifth harmonic component ($I^{++}_5$ sin (5θ)) of the current from the base component ($I^{++}_1$ sin θ) of the current. The torque $T^{++}$ is thus expressed by the following equation (4).

$$T^{++} = \{I_1^{++}\sin(\theta) - I_5^{++}\sin(5\theta)\} \times \{\phi_1\sin(\theta) - \phi_5\sin(5\theta)\} + \qquad (4)$$
$$\{I_1^{++}\sin(\theta - 120) - I_5^{++}\sin(5(\theta - 120))\} \times$$
$$\{\phi_1\sin(\theta - 120) - \phi_5\sin(5(\theta - 120))\} +$$
$$\{I_1^{++}\sin(\theta + 120) - I_5^{++}\sin(5(\theta + 120))\} \times$$
$$\{\phi_1\sin(\theta + 120) - \phi_5\sin(5(\theta + 120))\}$$
$$= 1.5 \times \{I_1^{++}\phi_1 \underline{-I_1^{++}\phi_5\sin(6\theta + 90) - I_5^{++}\phi_1\sin(6\theta + 90)} +$$
$$I_5^{++}\phi_5\}$$

The equation (4) indicates that the first term and the fourth term of its last line are constant terms and the second term and the third term (underlined part) are sixth harmonic terms. For this reason, it indicates that the sixth harmonic torque ripple is generated. According to the conventional technical concept, it is theoretically possible to cancel out the sixth harmonic torque ripple by setting the amplitudes of the current and the magnetic flux in the second term and the third term to satisfy $-(I^{++}_1\psi_5) \approx I^{++}_5\Psi_1$. It is however not necessarily possible to cancel out the sixth harmonic torque ripple depending on a relation between the amplitude $\psi_5$ of the fifth harmonic component of the magnetic flux and the amplitude $I_5$ of the fifth harmonic component of the current.

Figure 8B:
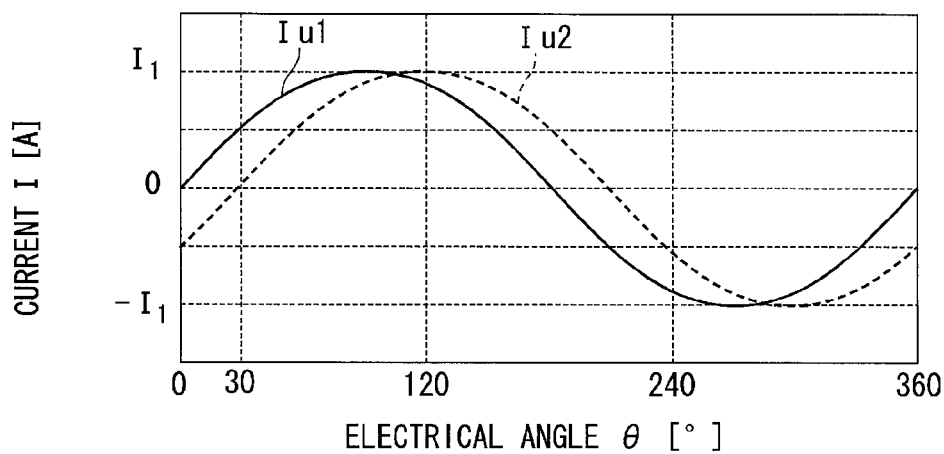
Figure 8C:
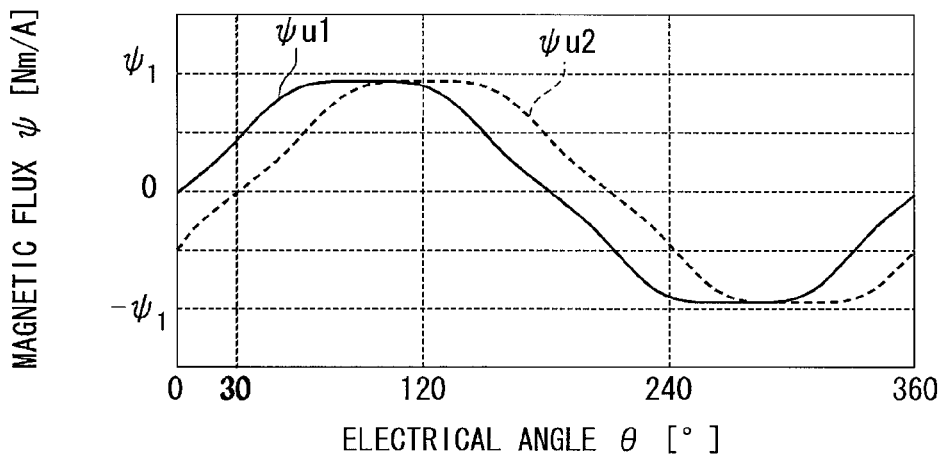

The ECU 10 of the first embodiment is assumed to control the motor of two drive systems 80 having the phase difference of 30° as shown in FIG. 8 without superimposing the fifth harmonic current on the base component of current. When the magnetic flux includes the fifth harmonic distortion component, the magnetic flux changes as shown in FIG. 8C. The current is indicated by only the base component as shown in FIG. 8B. In FIG. 8B and FIG. 8C, the current Iu2 and the magnetic flux $\psi u2$ of the second drive system are the same as the current Iu1 and the magnetic flux $\psi u1$ but are delayed 30° in phase relative to those of the first drive system.

In this instance, the torque T1 of the first drive system is expressed as the equation (5.1) similarly to the equation (3.1).

$$T1 = I_1\sin(\theta) \times \{\phi_1\sin(\theta) - \phi_5\sin(5\theta)\} + \qquad (5.1)$$
$$I_1\sin(\theta - 120) \times \{\phi_1\sin(\theta - 120) - \phi_5\sin(5(\theta - 120))\} +$$
$$I_1\sin(\theta + 120) \times \{\phi_1\sin(\theta + 120) - \phi_5\sin(5(\theta + 120))\}$$
$$= 1.5 \times \{I_1\phi_1 \underline{+ I_1\phi_5\sin(6\theta + 90)}\}$$

As shown in FIG. 8A, a torque ripple having an amplitude of $1.5 \times I_1\Psi_5$ and a cycle period of 60° is generated.

On the other hand, the torque T2 of the second drive system is expressed as the following equation (5.2) by replacing $\theta$ in the equation (5.1) with ($\theta-30$).

$$T2 = I_1\sin(\theta - 30) \times \{\phi_1\sin(\theta - 30) - \phi_5\sin(5(\theta - 30))\} + \qquad (5.2)$$
$$I_1\sin(\theta - 150) \times \{\phi_1\sin(\theta - 150) - \phi_5\sin(5(\theta - 150))\} +$$
$$I_1\sin(\theta + 90) \times \{\phi_1\sin(\theta + 90) - \phi_5\sin(5(\theta + 90))\}$$
$$= 1.5 \times \{I_1\phi_1 \underline{- I_1\phi_5\sin(6\theta + 90)}\}$$

A part of the equation (5.2), that is, {sin(θ−30)×sin (5(θ−30))+ ... }, is calculated to be opposite in polarity to the result of calculation of the equation (3.2) by the equation (5.3), which is similar to the equation (3.2).

$$\{\sin(\theta - 30) \times \sin(5(\theta - 30))\} + \{\sin(\theta - 150) \times \sin(5(\theta - 150))\} + \quad (5.3)$$
$$\{\sin(\theta + 90) \times \sin(5(\theta + 90))\} =$$
$$\{\sin(\theta - 30) \times \sin(5\theta - 150)\} +$$
$$\{\sin(\theta - 150) \times \sin(5\theta - 750))\} +$$
$$\{\sin(\theta + 90) \times \sin(5\theta + 450))\} =$$
$$\{\sin(\theta - 30) \times \sin(5\theta - 150)\} +$$
$$\{\sin(\theta - 150) \times \sin(5\theta - 30))\} +$$
$$\{\sin(\theta + 90) \times \sin(5\theta + 90)\} =$$
$$-\frac{1}{2}\{\cos(6\theta - 180) - \cos(4\theta - 120) + \cos(6\theta - 180) -$$
$$\cos(4\theta + 120) + \cos(6\theta + 180) - \cos(4\theta)\} =$$
$$-\frac{1}{2}\{3 \times \cos(6\theta - 180) - \cos(4\theta) - 2\cos(4\theta)\cos(-120)\} =$$
$$-\frac{1}{2}\left\{-3 \times \cos(6\theta) - \cos(4\theta) - 2\cos(4\theta) \times \left(-\frac{1}{2}\right)\right\} =$$
$$\frac{3}{2}\cos(6\theta) = 1.5 \times \sin(6\theta + 90)$$

The sum of torque Tsum of the torques T1 and T2 is defined as the following equation (5.4), since the sixth harmonic torque ripple in the second term (underlined) of the last line in the equations (5.1) and (5.2) are canceled out.

$$T\text{sum} = 3 \times I_1 \psi_1 = 1.5 \times I^{++}_1 \psi_1 \quad (5.4)$$

That is, the sum of torque Tsum equals the torque of the motor of one drive system defined by the equation (2). In the motor 80 of two drive systems having the phase difference of 30° according to the first embodiment, as described above, the sixth harmonic torque ripples are always cancelled out at any phase and without being affected by the amplitude $\psi_5$ of the fifth harmonic component of the magnetic flux distortion.

Figure 9A:
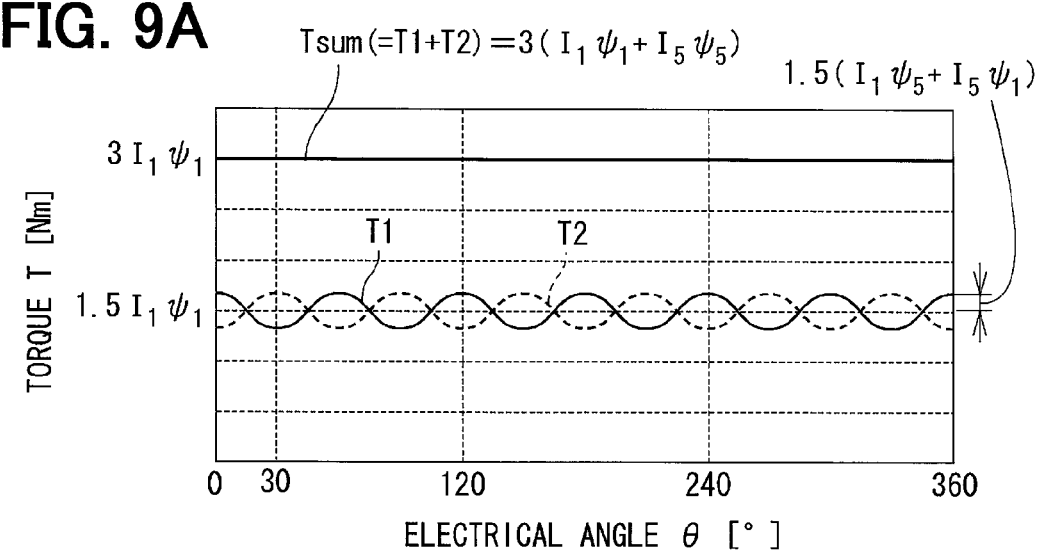
FIGS. 9A, 9B and 9C are waveform charts of torque, current and magnetic flux, respectively, in a case, in which the fifth harmonic current is superimposed in the control apparatus for a three-phase rotary machine according to the first embodiment.
Figure 9B:
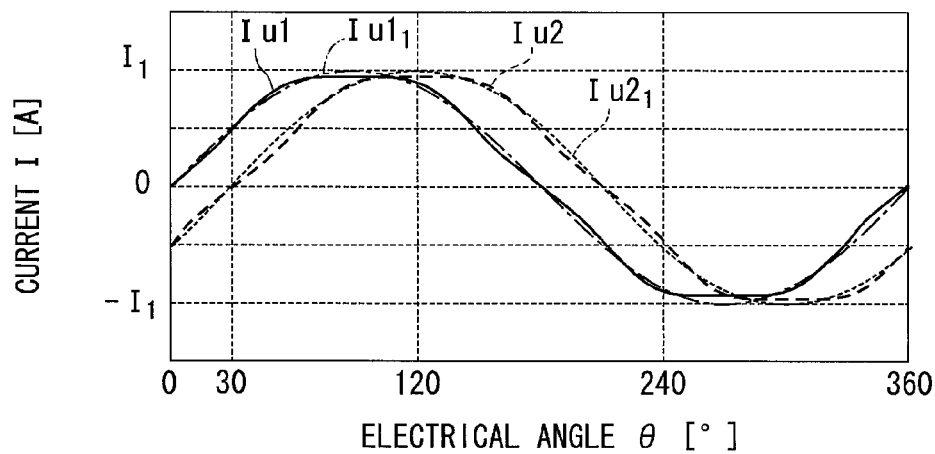
Figure 9C:
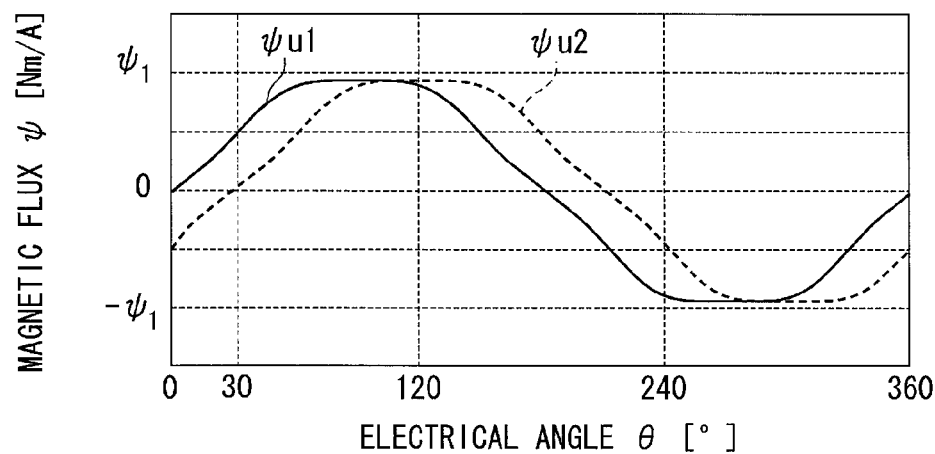

Next, the ECU 10 of the first embodiment is assumed to control the motor 80 of two drive systems having the phase difference of 30° as shown in FIG. 9A by superimposing the fifth harmonic current on the base component of current. In this case, the current and the magnetic flux, which includes the fifth harmonic distortion component, change as shown in FIG. 9B and FIG. 9C, respectively. In FIG. 9B and FIG. 9C, the current Iu2 and the magnetic flux ψu2 of the second drive system are the same as the current Iu1 and the magnetic flux ψu1 of the first drive system but are delayed 30° in phase relative to those of the first drive system.

Figure 10:
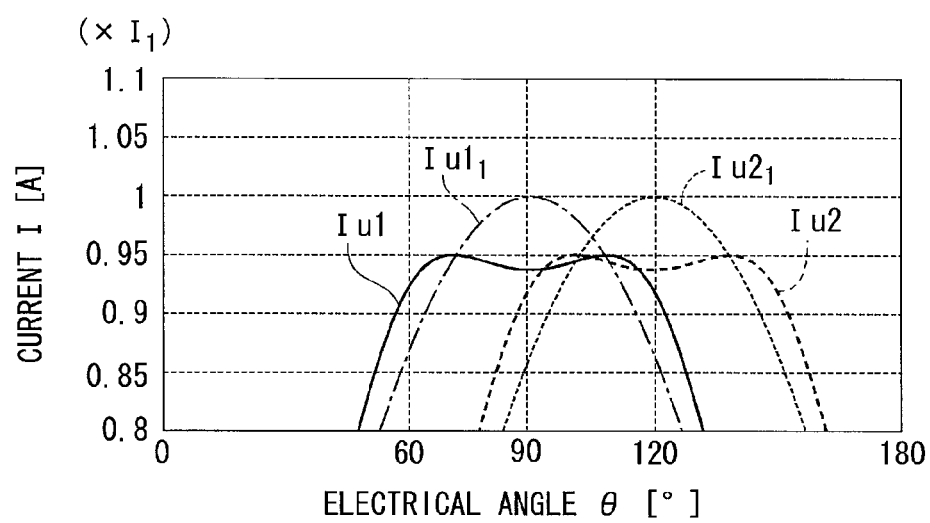
FIG. 10 is an enlarged waveform chart of a peak part of a phase current shown in FIG. 9B.

In FIG. 9B and FIG. 10, which is an enlarged view of the peak portion, the waveforms of currents Iu1$_1$ and Iu2$_1$ of only the base components, which correspond to the current waveforms of FIG. 8B, are shown by fine lines for reference. In the figure, the current amplitude $I_5$ of the fifth harmonic component is assumed to be positive and 6.3% of the current amplitude $I_1$ of the base component. As shown in FIG. 10, the waveforms of currents Iu1 and Iu2, which include the superimposed fifth harmonic currents, have smoothed peak portion of the base component. The peak value is reduced about 5% relative to those of the waveforms of currents Iu1$_1$ and Iu2$_1$ of only the base component.

In this case, the torque T1 of the first drive system is expressed as the equation (6.1).

$$T1 = \{I_1\sin(\theta) - I_5\sin(5\theta)\} \times \{\phi_1\sin(\theta) - \phi_5\sin(5\theta)\} + \quad (6.1)$$
$$\{I_1\sin(\theta - 120) - I_5\sin(5(\theta - 120))\} \times \{\phi_1\sin(\theta - 120) -$$
$$\phi_5\sin(5(\theta - 120))\} +$$
$$\{I_1\sin(\theta + 120) - I_5\sin(5(\theta + 120))\} \times \{\phi_1\sin(\theta + 120) -$$
$$\phi_5\sin(5(\theta + 120))\}$$
$$= 1.5 \times \{I_1\phi_1 + \underline{I_1\phi_5\sin(6\theta + 90) + I_5\phi_1\sin(6\theta + 90)} + I_5\phi_5\}$$

As shown in FIG. 9A, a torque ripple having an amplitude of $1.5(I_1\psi_5 + I_5\psi_5)$ and a cycle period of 60° is generated. That is, the torque ripple of each system is increased relative to a case, in which the fifth harmonic current is not superimposed.

On the other hand, the torque T2 of the second drive system is expressed as the following equation 6.2 by replacing θ in the equation 6.1 with (θ−30).

$$T2 = \{I_1\sin(\theta - 30) - I_5\sin(5(\theta - 30))\} \times \{\phi_1\sin(\theta - 30) - \quad (6.2)$$
$$\phi_5\sin(5(\theta - 30))\} +$$
$$\{I_1\sin(\theta - 150) - I_5\sin(5(\theta - 150))\} \times \{\phi_1\sin(\theta - 150) -$$
$$\phi_5\sin(5(\theta - 150))\} +$$
$$\{I_1\sin(\theta + 90) - I_5\sin(5(\theta + 90))\} \times \{\phi_1\sin(\theta + 90) -$$
$$\phi_5\sin(5(\theta + 90))\}$$
$$= 1.5 \times \{I_1\phi_1 - \underline{I_1\phi_5\sin(6\theta + 90) - I_5\phi_1\sin(6\theta + 90)} + I_5\phi_5\}$$

The sum of torque Tsum of the torques T1 and T2 is defined as the following equation 6.3, since the sixth harmonic torque ripples in the second term and the third term (underlined) in the last lines in the equations (6.1) and (6.2) are cancelled out.

$$T\text{sum} = 3 \times (I_1\Psi_1 + I_5\Psi_5) \quad (6.3)$$
$$= 1.5 \times (1_1^{++}\Psi_1 + I_5^{++}\Psi_5)$$

Here, when $(I_5/I_1)$ is 6.3% and $(\psi_5/\psi_1)$ is 5%, $(I_5\psi_5/I_1\psi_1)$ is 0.315%. As a result, as far as $I_1\psi_1$ and $I_5\psi_5$ are in the same sign in polarity, the sum of torque Tsum increases because of the product of the current amplitude of the fifth harmonic component and the term $I_5\psi_5$ of the magnetic flux amplitude $I_5$. However, this contribution is small. Thus, the sum of torque Tsum generally equals the sum of torque, which does not include the superimposed fifth harmonic component and expressed by the equation (5.4), and the one drive system torque as defined by the equation (2).

In the motor 80 of two drive systems having the phase difference of 30° according to the first embodiment, as described above, the sixth harmonic torque ripples are cancelled out always even when the current of the fifth harmonic component is superimposed. This cancellation of torque ripple of sixth harmonic component is not dependent on the phase and is not influenced by the current amplitude I5 of the fifth harmonic component and the magnetic flux amplitude $\psi_5$ of the fifth harmonic component.

The ECU 10 of the first embodiment provides the following operations and advantages.

(1) In the ECU 10, the amplitudes of the AC currents outputted from the inverters 601, 602 of the two drive systems are equal to each other and are different in phase by 30°. Thus, in the case that the magnetic flux includes the distortion component of fifth harmonic, the torque ripples of sixth harmonic can be cancelled out in the sum of torques of the two drive systems whether the fifth harmonic current is superimposed or not.

(2) By superimposing the fifth harmonic current relative to the base wave current of the base component, the peak value of current can be reduced. Thus, heat generation influenced by the peak value of current can be reduced.

(3) The amplitude calculation section 22 sets the amplitude $I_5'$ of the fifth harmonic component of the AC current in accordance with the angular velocity ω. More specifically, the amplitude $I_5'$ is increased as the angular velocity ω approaches zero, the AC current of the fifth harmonic component is not superimposed when the absolute value of the angular velocity ω is greater than the threshold value $ω_0$. The heat generation related to the peak value of the phase current becomes more problematic in the low rotation range of the motor 80, in which the angular velocity to is close to zero. On the other hand, in the high rotation range, the effective value of the phase current is more influential on heat generation than the peak value. By thus changing the amplitude $I_5$ of the fifth harmonic current in accordance with the angular velocity ω, it becomes possible to effectively control the motor to match needs.

In the electric power steering system 1 described above as the first embodiment, the motor 80 is required to provide a large torque from its stop state when the steering wheel 91 is operated at the time of starting a vehicle to move.

The current feedback calculation section 301 of the first embodiment shown in the control block diagram of FIG. 5 may be modified as second, third and fourth embodiments, as described below with reference to FIG. 11, FIG. 12 and FIG. 13, respectively. In the following explanation, substantially the same parts, which are assigned the same reference numerals, will not be described.

Second Embodiment

Figure 11:
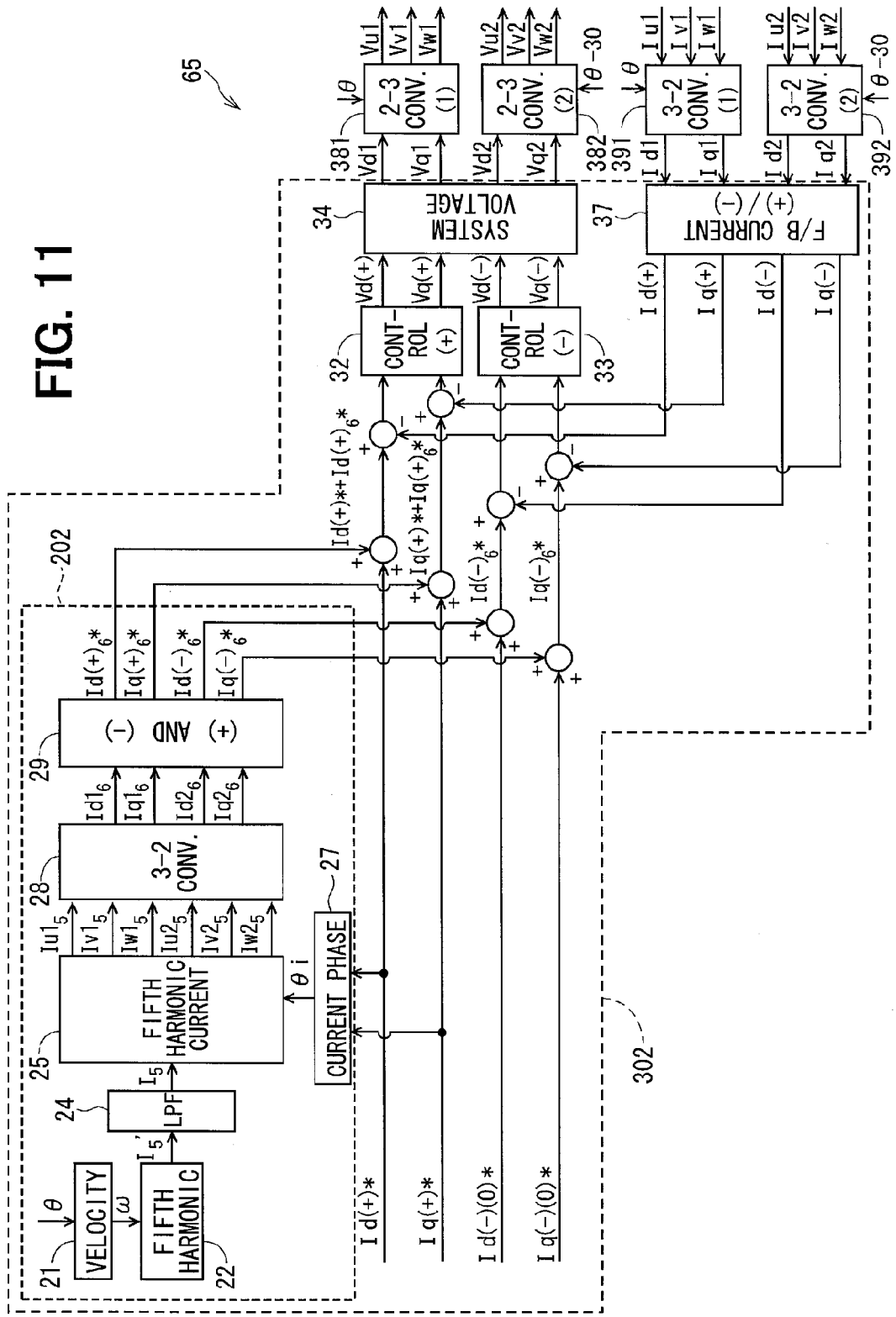
FIG. 11 is a block diagram of a control part of a control apparatus for a three-phase motor according to a second embodiment.

In a second embodiment shown in FIG. 11, a current feedback calculation section 302 is different from the current feedback calculation section 301 of the first embodiment. The current feedback calculation section 302 does not feedback-control the q-axis current of each system but feedback-controls a sum (+) and a difference (−) of the d-axis and q-axis currents of the two drive systems. In the following description, the difference between the two drive systems, which is used with respect to the current or the voltage, means a value calculated by subtracting a value of the second drive system and a value of the first drive system. According to the second embodiment, a sum controller 32 and a difference controller 33 are provided in the feedback main part in place of the controller 311, 312 of each system. Further as the d-axis and q-axis current command values Id(+)*, Iq(+)*, which are sums of current command values of two drive systems, and Id(−)*, Iq(−)*, which are differences of the current command values of two drive systems, are generated. Since the first inverter 601 and the second inverter 602 have the same electrical characteristic property, the differences Id(−)* and Iq(−)s* between the current command values of the two drive systems are basically 0.

In a superimposition current calculation section 202, d-axis and q-axis currents of sixth harmonic $Id1_6$, $Iq1_6$, $Id2_6$, $Iq2_6$, which are converted by the 3-2 conversion section 28 from the phase currents of fifth harmonic, are converted by a superimposition sum and difference calculation section 29 into superimposition current command values $Id(+)_6^*$, $Iq(+)_6^*$, $Id(-)_6^*$, $Iq(-)_6^*$, respectively. These superimposition current command values are added to the current command values Id(+)*, Iq(+)*, Id(−)*(0) and Iq(−)*(0), respectively.

A sum controller 32 is inputted with a difference (−) between the current command value (Id(+)*+Id(+)$_6$*), which includes the added superimposition current command value, and the current detection value Id(+), which is calculated by the feedback current sum and difference calculation section 37. The sum controller 32 also is inputted with a difference between the command value (Iq(+)*+Iq(+)$_6$*), which includes the added superimposition current command value, and the current detection value Iq(+), which is calculated by the feedback current sum and difference calculation section 37. The sum controller 32 calculates the sums of the voltage command values of the two drive systems, Vd(+), Vq(+) by the proportional and integral control calculation so that this difference (−) may be converged to 0. Similarly, a difference controller 33 is inputted with a difference between (Id(−)*(0)+Id(−)$_6$*) and (Iq(−)*(0)+Iq(−)$_6$*) and a difference between Id(−) and Iq(−). The difference controller 33 calculates the differences of the voltage command values of the two drive systems, Vd(−) and Vq(−) by the proportional and integral control calculation so that this difference may be converged to 0.

A system voltage calculation section 34 converts Vd(+), Vq(+), Vd(−), Vq(−) into the voltage command values Vd1, Vq1, Vd2, Vq2 for the first and second systems, and outputs the voltage command values to the 2-3 conversion sections 381, 382.

A feedback current sum and difference calculation section 37 converts the current detection values Id1, Iq1, Id2, Iq2, which are inputted from the 3-2 conversion sections 391, 392 to Id(+), Iq(+), Id(−), Iq(−).

Third Embodiment

Figure 12:
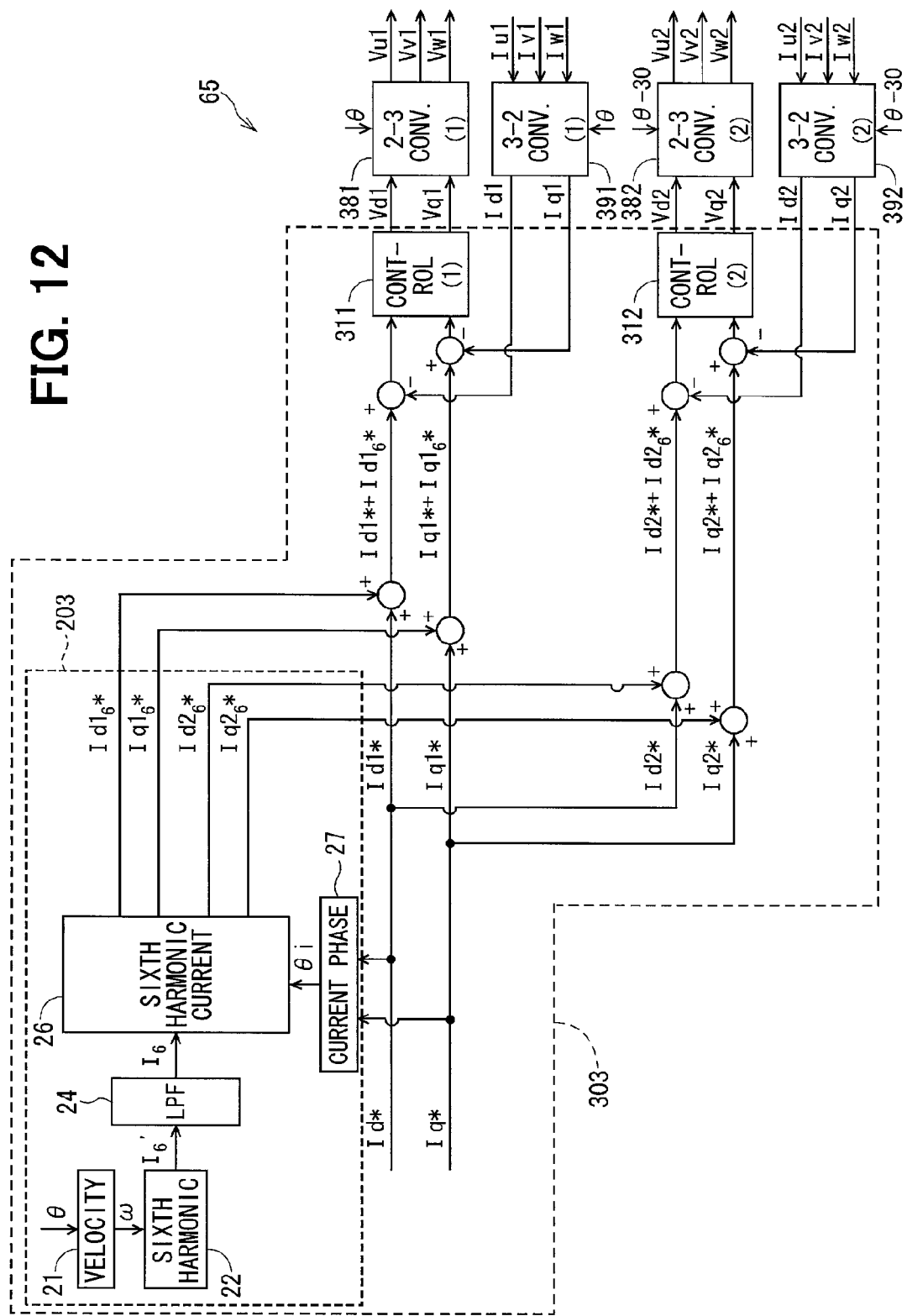
FIG. 12 is a block diagram of a control part of a control apparatus for a three-phase motor according to a third embodiment.

In a third embodiment shown in FIG. 12, a current feedback calculation section 303 is different from the current feedback calculation section 301 of the first embodiment. The current feedback calculation section 303 does not calculate the sixth harmonic current command values by d-q conversion after calculating the fifth harmonic phase currents but directly calculates d-axis and q-axis current command values of sixth harmonic by a sixth harmonic current calculation section 26. The amplitude calculation section 22 of a superimposition current calculation section 203 calculates a sixth harmonic current amplitude $I_6'$ in place of the fifth harmonic current amplitude $I_5'$ in the first and the second embodiments. The sixth harmonic current amplitude $I_6'$ is calculated in the similar manner as the current amplitude $I_5'$ in the first and the second embodiments as shown in FIG. 6. That is, the current amplitude $I_6'$ is calculated in accordance with the angular velocity CD so that the amplitude $I_6'$ increases as the angular velocity o approaches zero. It is then processed by the low-pass filter 24 and inputted to the sixth harmonic d-axis and q-axis current calculation section 26 as the filtered current amplitude $I_6$.

In the sixth harmonic d-axis and q-axis current calculation section 26, the sixth harmonic current command values are calculated by the following equations (7.1) to (7.4) by using the current amplitude $I_6$ and the current phase θi.

$$Id1_6^* = I_6 \sin(6θ-5θi) \tag{7.1}$$

$$Iq1_6^* = I_6 \cos(6θ-5θi) \tag{7.2}$$

$$Id2_6^* = -I_6 \sin(6θ-5θi) \tag{7.3}$$

$$Iq2_6^* = -I_6 \cos(6θ-5θi) \tag{7.4}$$

Thus it is possible to reduce calculation load relative to the first embodiment, which performs the d-q conversion after calculating the fifth harmonic phase current.

Fourth Embodiment

Figure 13:
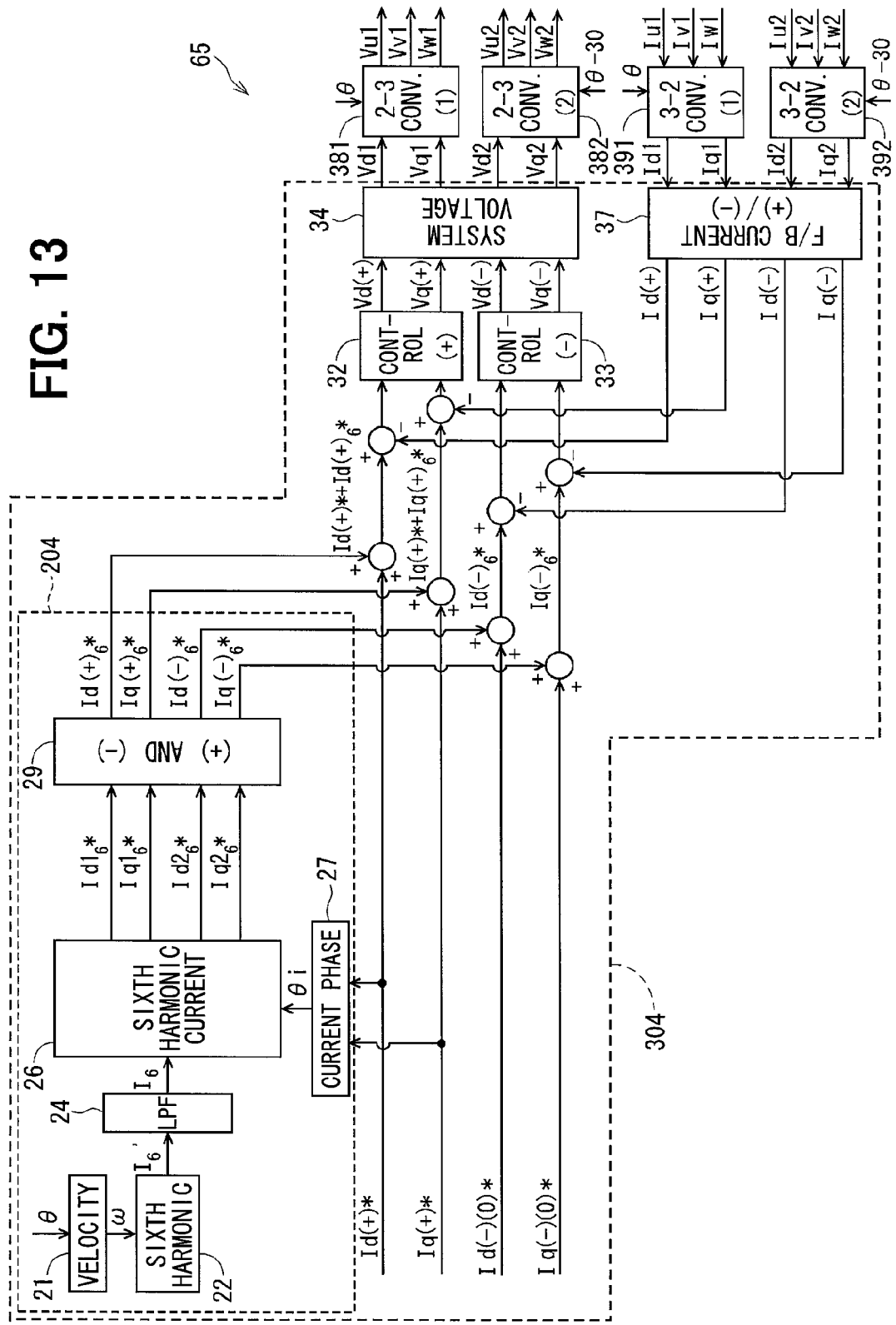
FIG. 13 is a block diagram of a control part of a control apparatus for a three-phase motor according to a fourth embodiment.

In a fourth embodiment shown in FIG. 13, a current feedback calculation section 304 is configured by combining the feedback control of sum and difference in the second embodiment (FIG. 11) and the sixth harmonic current calculation in the third embodiment (FIG. 12). A superimposition current calculation section 204 includes the sixth harmonic d-axis and q-axis current calculation section 26 and the superimposition current sum and difference calculation section 29. In the fourth embodiment, calculation load can be reduced relative to the second embodiment.

OTHER EMBODIMENTS (a) In the above-described embodiments, with respect to the phase difference in currents between the two systems, the phase of the AC current of the second drive system is delayed exemplarily by an angle of +30°, which correspond to the electrical angle of 30°, relative to the AC current of the first drive system. Alternatively, the phase of the AC current of the second drive system may be advanced exemplarily by an angle of −30°, which correspond to the electrical angle of 30°, relative to the AC current of the first drive system. Further, the phase of the U-phase of the second drive system may be shifted ±90° or ±150°, which corresponds to the electrical angle of ±30°, relative to the V-phase or the W-phase (±120° relative to the U-phase) of the first drive system. This is so generalized that the same operation and advantages of the above-described embodiments are provided as far as the phase difference of currents between two systems is (30±60× n)°, in which "n" is an integer.

(b) The ECU 10 may be configured differently from the above-described embodiments. For example, the switching elements may be field-effect transistors other than MOSFETs or IGBTs.

(c) The control apparatus for a three-phase rotary machine is not limited to a use for an electric power steering system but may be used as a control apparatus for other types of three-phase motors or generators.

What is claimed is:

1. A control apparatus for controlling driving of a three-phase rotary machine having two three-phase winding sets, the control apparatus comprising:
two drive systems of power converters provided in correspondence to the two three-phase winding sets to output AC currents to the two three-phase winding sets, the AC currents having same amplitude each other and a phase difference of (30±60×n)° therebetween, with "n" being an integer; and
a controller unit for controlling output of the three-phase rotary machine,
wherein the controller unit superimposes on a base wave current, which is an AC current and a main component of an output of the three-phase rotary machine, fifth harmonic currents of a frequency of as high as fivefold of the base wave current and of a same amplitude to the two three-phase winding sets, thereby reducing a peak value of the base wave current.

2. The control apparatus for a three-phase rotary machine according to claim 1, wherein:
the controller unit changes the amplitude of the fifth harmonic currents, which are superimposed on the basic wave current, in accordance with a rotation angular velocity of the three-phase rotary machine.

3. The control apparatus for a three-phase rotary machine according to claim 2, wherein:
the controller unit increases the amplitude of the fifth harmonic currents, which are superimposed on the basic wave current, as the angular velocity of the three-phase rotary machine approaches zero.

4. An electric power steering system comprising:
a three-phase rotary machine for generating an assist torque, which assists steering operation of a vehicle;
the control apparatus for a three-phase rotary machine according to claim 1; and
a transfer means for transferring rotation of the three-phase rotary machine to a steering shaft.

5. The control apparatus for a three-phase rotary machine according to claim 1, wherein:
the fifth harmonic currents are superimposed to cancel out torque ripples caused by the fifth harmonic currents in relation to the two winding sets.

6. A control apparatus for controlling driving of a three-phase rotary machine having two three-phase winding sets, the control apparatus comprising:
two drive systems of power converters provided in correspondence to the two three-phase winding sets to output AC currents to the two three-phase winding sets, the AC currents having same amplitude each other and a phase difference of (30±60×n)° therebetween, with "n" being an integer; and
a controller unit for controlling output of the three-phase rotary machine,
wherein the controller unit superimposes on a base wave current, which is an AC current and a main component of an output of the three-phase rotary machine, a high harmonic current which is equivalent to a sixth harmonic current of a frequency of as high as sixfold of the base wave current in a d-q axis coordinate, thereby reducing a peak value of the base wave current and cancelling out torque ripples caused by the high harmonic currents in relation to the two winding sets.

* * * * *